(No Model.)

W. BARTH.
TOY.

No. 557,756. Patented Apr. 7, 1896.

Witnesses:
Edwin G. McKee
A. E. Hall.

Inventor
William Barth
By John Wedderburn
Attorney

UNITED STATES PATENT OFFICE.

WILLIAM BARTH, OF GYPSUM, COLORADO.

TOY.

SPECIFICATION forming part of Letters Patent No. 557,756, dated April 7, 1896.

Application filed August 29, 1895. Serial No. 560,878. (No model.)

*To all whom it may concern:*

Be it known that I, WILLIAM BARTH, a citizen of the United States, residing at Gypsum, in the county of Eagle and State of Colorado, have invented certain new and useful Improvements in Toys; and I do hereby declare the following to be a full, clear, and exact description of the invention, such as will enable others skilled in the art to which it appertains to make and use the same.

This invention relates to certain new and useful improvements in toys of that class which are mounted upon wheels; and it has for its object, among others, to provide a simple and cheap yet durable toy which will afford amusement to the old as well as to the young. I mount upon a base or wagon adapted to be drawn along the floor or other support a mule or other animal, which is pivotally supported so as to be caused to kick through mechanism actuated by the movement of the wagon and the hind legs to be propelled rearward, as in the act of kicking, while upon the back of the animal is mounted a figure, as a fat darky, so arranged as to be thrown off the back of the mule, when desired, through mechanism under the control of the operator, so that he may be made to stay upon the back of the animal a longer or a shorter time.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1:
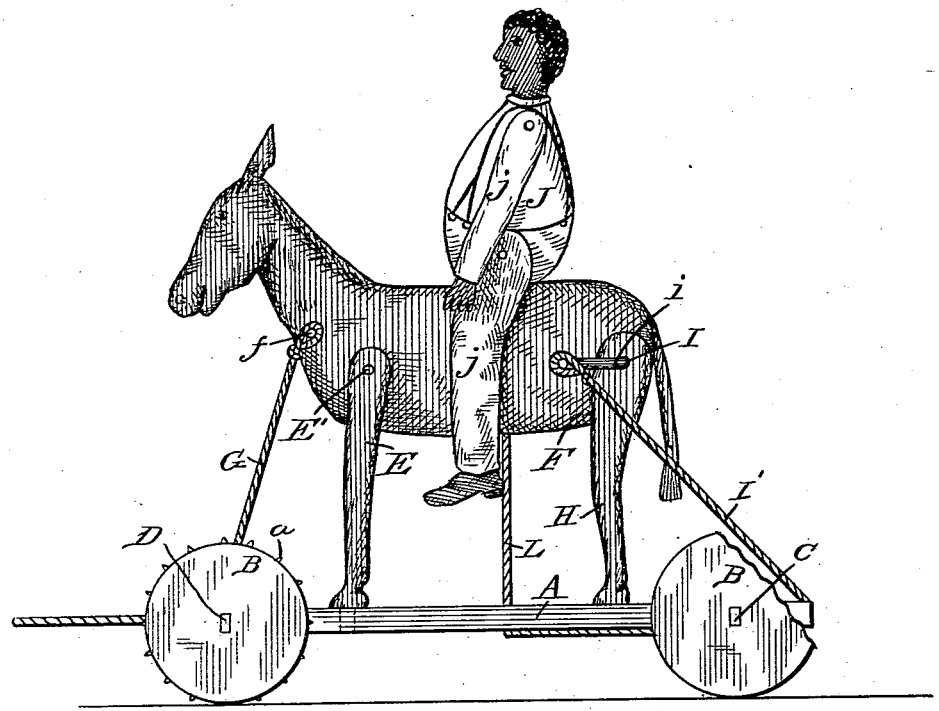
Figure 2:
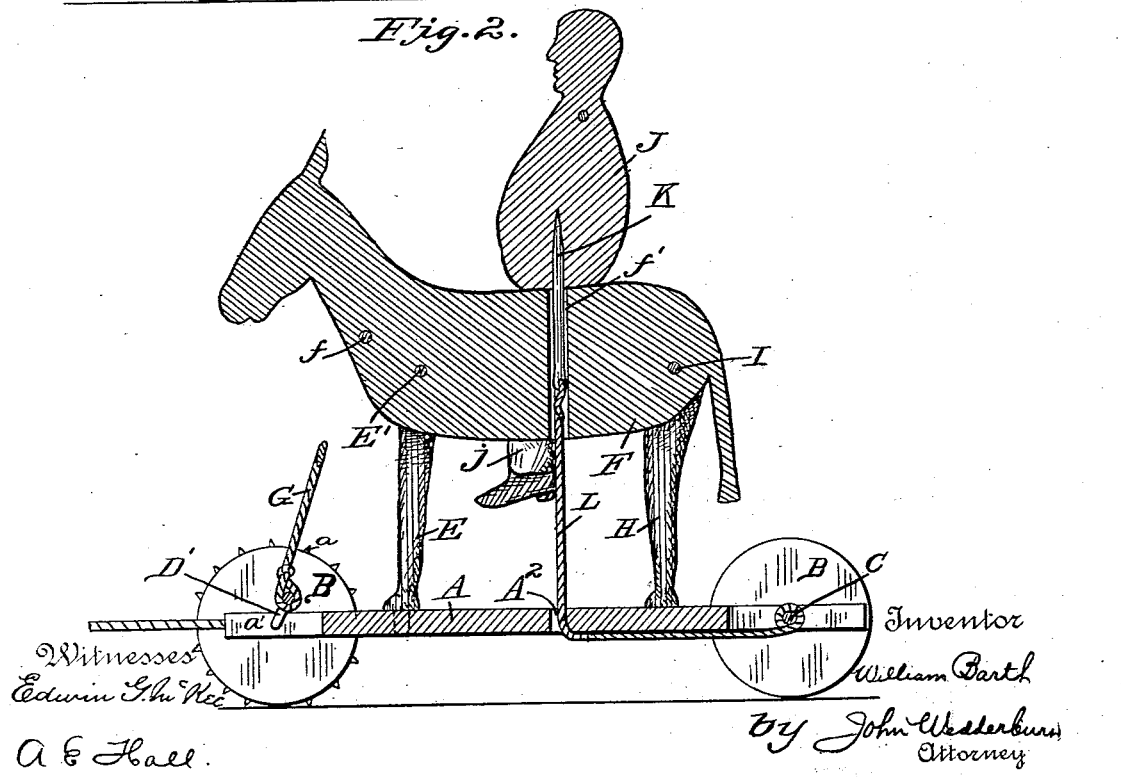

Figure 1 is a side elevation of my improved toy. Fig. 2 is a vertical longitudinal section through the same.

Like letters of reference indicate like parts throughout the views.

Referring now to the details of the drawings by letter, A designates the platform or support, mounted upon the four wheels B, the rear wheels being carried by the rear axle C, while the front axle D is provided with a crank D', as shown. The front or rear wheels, either or both, may be provided with spurs a, as indicated in Fig. 1, if desired. The front end of the platform is provided with a longitudinal opening a' for the working of the crank of the front axle, as shown.

E are uprights rising from the platform near the front end, and upon a horizontal rod or pin E', supported in the upper ends of these uprights, is mounted for pivotal action the body F of a mule or other animal. A rod or wire G connects in any suitable manner at one end with a pin or lateral projection f on the neck of the mule and at the other end to the crank of the front axle. The uprights constitute the front legs of the animal, which, it will be understood, are stationary. The rear or hind legs H of the mule are fixedly held upon the rod or pin I, which passes through the rear portion of the animal, and one end is extended and has attached thereto a cord or rope I', which is attached to a crank-arm i thereon, while the other end of said cord is secured to some fixed part, as the platform A.

As the wagon is propelled forward the animal is caused to rock on its pivot, as in the act of bucking, and as it is moved on its pivot the hind legs are thrown rearward through the connection of the cord with the crank-arm of the pin which carries the hind legs, as will be readily understood.

J represents a figure—say of a fat darky—having pivoted legs and arms j, and this figure is seated upon the back of the body portion of the animal, with his legs dangling upon either side thereof, as shown. It is held thereupon by means of a bolt or pin K, which is passed upward through a hole f' made in the body of the animal to the rear of the center thereof, the said pin or bolt being attached to a string or cord L, the other end of which, after passing through a hole $A^2$ in the platform A, is secured to and wound upon the rear axle. As the mule is rocked on its pivot and the hind legs thrown out this pin or bolt is drawn out through the medium of the string or cord being wound upon the axle and the darky is thrown off. By lengthening or shortening the string or cord L or winding it more or less upon the rear axle the pin or bolt will be withdrawn sooner or later, as may be desired.

The parts may be constructed of any suitable material, either wood or metal, or a combination of the two, and modifications in detail may be resorted to without departing from the spirit of the invention or sacrificing any of its advantages.

What I claim as new is—

1. A toy comprising a wagon, an animal being pivotally mounted, hind legs connected to be thrown out as the animal is rocked on its pivot, a figure mounted on the back of the animal, a removable pin passed vertically through the body of the animal and into the body of the figure, and a cord having one end attached to said pin and the other end connected with and adapted to be wound upon the axle to detach said figure from the animal, substantially as shown and described.

2. The combination of a pivotally-mounted animal, having pivoted hind legs, a figure detachably mounted upon the back thereof, means for rocking the animal and causing him to throw out his hind legs, a pin passed vertically through the body of the animal into the body of the figure, and a cord connected with one end of said pin, extended downwardly and thence rearwardly and connected with and adapted to be wound upon the rear axle to remove said pin from its engagement with the body of said figure, substantially as shown and described.

In testimony whereof I have signed this specification in the presence of two subscribing witnesses.

WILLIAM BARTH.

Witnesses:
 WILLIAM KENT,
 PETER BARTH.